(12) United States Patent
Percinic et al.

(10) Patent No.: US 12,722,713 B2
(45) Date of Patent: Sep. 1, 2026

(54) ROOF MODULE COMPRISING A COOLING MECHANISM

(71) Applicant: Webasto SE, Stockdorf (DE)

(72) Inventors: Antonio Percinic, Stockdorf (DE); Juraj Lehotsky, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 342 days.

(21) Appl. No.: 18/522,661

(22) Filed: Nov. 29, 2023

(65) Prior Publication Data

US 2024/0190510 A1 Jun. 13, 2024

(30) Foreign Application Priority Data

Dec. 7, 2022 (DE) ..................... 10 2022 132 516.4

(51) Int. Cl.
*B62D 25/07* (2006.01)
*G01D 11/24* (2006.01)

(52) U.S. Cl.
CPC ........... *B62D 25/07* (2013.01); *G01D 11/245* (2013.01)

(58) Field of Classification Search
CPC . B60J 7/0084; B60J 7/022; B60J 10/25; B60J 10/82; B60J 7/043; B60J 10/24; B62D 25/07; G01D 11/245
USPC .................................. 296/210–219; 454/129
See application file for complete search history.

(56) References Cited

U.S. PATENT DOCUMENTS 8,096,144 B2 * 1/2012 Castren ..................... F24F 7/04 62/404
10,561,044 B2 * 2/2020 Schmidt ............. H05K 7/20272
10,627,488 B2 * 4/2020 Dubey .................. G01S 7/4813
11,480,451 B2 * 10/2022 Ellgas .................... G01D 11/24
2023/0382204 A1 * 11/2023 Sviberg ............. B60H 1/00271

FOREIGN PATENT DOCUMENTS

DE 102021122866 A1 3/2023

OTHER PUBLICATIONS

Office Action issued against corresponding German Application No. 10 2022 132 516.4; dated August 16, 2023; In German with English Machine Translation (6 pages).

* cited by examiner

*Primary Examiner* — Amy R Weisberg
*Assistant Examiner* — Philip C Adams
(74) *Attorney, Agent, or Firm* — Fitch, Even, Tabin & Flannery, LLP

(57) ABSTRACT

A roof module for forming a vehicle roof on a motor vehicle, the roof module having a panel component which at least partially forms a roof skin of the vehicle roof, the roof skin serving as an outer sealing surface of the roof module, at least one environment sensor configured to send and/or receive electromagnetic signals through a roof see-through area to detect a vehicle environment, and a cooling mechanism having a cooling-air inlet, a filter member and at least one cooling channel, the cooling mechanism being configured to dissipate waste heat emitted by the environment sensor and/or ambient heat introduced from outside from the environment sensor. The filter member has a conical and/or pot-shaped shape and is provided at the cooling-air inlet and is configured to prevent and/or reduce an entry of foreign particles and/or liquid into an interior of the at least one cooling channel.

9 Claims, 6 Drawing Sheets

ROOF MODULE COMPRISING A COOLING MECHANISM

CROSS-REFERENCE TO RELATED APPLICATION

This application claims priority from German Patent Application Number 10 2022 132 516.4, filed on Dec. 7, 2022, which is hereby incorporated herein by reference in its entirety for all purposes.

FIELD

The invention relates to a roof module according to the preamble of claim 1. Furthermore, the invention relates to a motor vehicle comprising such a roof module.

BACKGROUND

Generic roof modules are used extensively in vehicle construction. For example, roof modules are prefabricated as separate functional modules and connected to a roof frame structure (which is part of the body structure) at the assembly line. The roof module at least partially forms a roof skin of the vehicle roof on its outer surface, the roof skin preventing moisture or airflow from entering the vehicle interior. The roof skin is formed by one or more panel components, which can be made of a stable material, such as painted metal or painted or solid-colored plastic. The roof module can be part of a rigid vehicle roof or part of an openable roof sub-assembly.

Furthermore, developments in vehicle construction are increasingly focusing on autonomously or semi-autonomously driving motor vehicles. In order to enable the vehicle control system to control the motor vehicle autonomously or semi-autonomously, a plurality of environment sensors (e.g., lidar sensors, radar sensors, (multi-)cameras, etc. including other (electrical) components) are used, which are integrated, for example, into the roof module, detect the environment surrounding the motor vehicle and determine, for example, a current traffic situation from the acquired environment data. Roof modules equipped with a plurality of environment sensors are also known as roof sensor modules (RSM). The known environment sensors send and/or receive electromagnetic signals, such as laser beams or radar beams, allowing a data model of the vehicle environment to be generated by signal evaluation and to be used for controlling the vehicle. In order to protect the environment sensors from harmful environmental influences, such as moisture and air currents, the environment sensors are usually installed in one or more sensor housings or integrated into the roof module. Either way, they protrude above a top of the roof skin formed by the roof module to provide each environment sensor with an all-round view within its working area.

For a best possible and reliable operation, safety and availability of the autonomous or semi-autonomous driving mode, the environment sensors and the other (electrical) components must be available as continuously as possible. An existing problem that can cause the (temporary) failure of an environment sensor is, for example, the build-up of heat around the environment sensor, which can cause it to overheat and consequently fail. Such a heat build-up can be caused not only by the environment sensor's own heat generated during operation, but alternatively or additionally by a hot outdoor climate, e.g., in midsummer, i.e., ambient heat, and can lead to overheating (e.g., of individual electronic components of the environment sensor). A hot outdoor climate or strong solar radiation can cause the entire roof skin to heat up considerably, in particular due to the exposed position of the environment sensors on the top of the roof skin. As the roof skin is often made of materials with good thermal conductivity properties (e.g., metal), a strong heat flow can occur from the outside of the vehicle roof towards the vehicle interior, in which case heat can accumulate in the installation spaces provided for the environment sensors, for example.

To avoid these heat-related problems, the use of a cooling mechanism is known, which is configured to dissipate waste heat produced by the at least one environment sensor and/or heat introduced into the roof module from the outside in order to keep the at least one environment sensor at a predetermined operating temperature.

For this purpose, known cooling mechanisms often comprise at least one cooling channel with a cooling-air inlet and a cooling-air outlet, supply air being aspirated from outside through the cooling-air inlet, passed through the cooling-air channel and discharged again from the cooling-air outlet. During the passage, the air flow absorbs heat in order to dissipate it from the roof module.

Several components, such as cooling fans, heat conduction elements, etc., are often disposed within the cooling mechanism. They are vulnerable to moisture introduced from outside and to contamination by foreign particles introduced into the cooling mechanism from outside, such as dust, dirt and/or stones and/or leaves and/or organic materials and/or insects. After all, air intake from outside carries the risk of contamination inside the cooling channel by dirt in solid or fluid form. In addition, components of the cooling mechanism can be damaged by foreign particles entering and may fail at least temporarily. Clogging of individual components of the cooling mechanism is also conceivable in principle. Foreign particles that have entered the cooling mechanism can also cause noise, which may be perceived as a disturbing noise by vehicle occupants.

To avoid failures and/or to extend the service life of the cooling components, foreign particles are prevented from entering the interior of the cooling channel or the cooling mechanism by filters. Such filters are usually disposed in the area of the cooling air inlet and are designed as flat air filters for filtering out foreign particles up to a certain size. Such a filter can also have a multi-layer or multi-part structure and, for example, have an air grille in the outer visible area of the roof module, which meets predetermined optical requirements and is designed, for example, to keep out coarse particles. Furthermore, known filters can comprise one or more fine filters in order to prevent smaller particles from entering the interior of the cooling mechanism.

With known filters, the arrangement and/or attachment and/or installation on the roof module, in particular in the area of the cooling air inlet, is often challenging and therefore cost-intensive. Furthermore, such an arrangement is associated with difficulties in thermal and/or electrical coupling with the other components of the roof module and/or the cooling mechanism. Furthermore, a simple and cost-effective solution for the replacement and/or cleaning and/or maintenance of such filters is not yet known. In addition, known filters often cause large pressure losses in the area of the cooling air inlet, in particular in the case where foreign particles have already accumulated on and/or adhered to the filter, since only a small amount of air can enter the interior of the cooling mechanism.

SUMMARY

One object of the invention is to propose a roof module that reduces the disadvantages of the known state of the art described above and in particular enables a more effective and/or efficient filtering of air.

The object is attained by the roof module according to claim 1.

Advantageous embodiments of the invention are the subject of the dependent claims. All combinations of at least two features disclosed in the description, the claims and/or the figures fall within the scope of the invention. It is understood that the explanations made with respect to the roof module relate in an equivalent manner to the motor vehicle according to the invention without being mentioned redundantly for the latter. In particular, it is to be understood that customary linguistic rephrasing and/or an analogous replacement of respective terms within the framework of customary linguistic practice, in particular the use of synonyms supported by generally recognized linguistic literature, are comprised by the present disclosure without being explicitly mentioned in their respective formulation.

According to the invention, a roof module for forming a vehicle roof on a motor vehicle is proposed. The roof module comprises a panel component which at least partially forms a roof skin of the vehicle roof, the roof skin serving as an outer sealing surface of the roof module. The roof module comprises at least one environment sensor configured to send and/or receive electromagnetic signals through a roof see-through area to detect a vehicle environment. The roof module comprises a cooling mechanism having a cooling-air inlet, a filter member and at least one cooling channel. The cooling mechanism is configured to dissipate waste heat emitted by the environment sensor and/or ambient heat introduced from outside from the environment sensor. The filter member has a conical and/or inclined and/or cylindrical and/or pot-shaped shape and is preferably provided and/or disposed and/or mounted on the cooling-air inlet or in the area of the cooling-air inlet. The filter member is configured to prevent and/or reduce the entry of foreign particles and/or a liquid into an interior of the at least one cooling channel and/or the cooling mechanism and/or other components of the cooling mechanism.

In its intended use, the roof module is preferably configured to be mounted on a motor vehicle in such a manner that the at least one environment sensor can detect the vehicle environment within its field of view with as little interference as possible. In its intended use, the filter member is preferably configured to be disposed on and/or accommodated by the cooling mechanism in such a manner that the entry of foreign particles and/or foreign bodies and/or liquid into the interior of the cooling mechanism is prevented or at least reduced.

The foreign particles may be, for example, dust and/or dirt and/or mud and/or stones and/or leaves and/or organic materials and/or insects and/or other particles.

In particular by providing the novel filter member, the roof module according to the invention has the advantage that the entry of fine particles and/or foreign particles (at least up to a predetermined size) into the interior of the cooling mechanism and/or into the interior of the at least one cooling channel can be effectively reduced. This is because the fine particles and/or foreign particles are caught by the filter member and thus do not reach the inside of the cooling mechanism. This can prevent damage to components of the cooling mechanism caused by such foreign particles. The filter member is also configured in such a manner that water and/or liquid and/or moisture can be prevented from entering the interior of the cooling mechanism. This keeps the interior as dry as possible. As a result, corrosion of components of the cooling mechanism, such as the at least one cooling channel, can be prevented.

The filter effect is significantly improved by the conical and/or inclined and/or cylindrical and/or pot-shaped shape compared to the prior art. On the one hand, a larger filter surface area is available than was the case with flat filters. On the other hand, the conical and/or inclined and/or cylindrical and/or pot-shaped shape can minimize a pressure drop across the filter compared to a flat filter.

In the case at hand, "conical" can be understood to mean that the filter member has the shape of a cone and/or a tapered shape. The shape of the filter member is comparable to the shape of a coffee filter, for example. The filter member comprises, for example, an inlet area with a diameter D1, which tapers, preferably continuously, along the length of the filter up to a diameter D2. The term "conical" can also mean roof-shaped, in which case the filter member can comprise, in particular schematically, the shape of a saddle roof or a hip roof with at least two planar slopes running towards each other. The term "conical" can also be understood to mean tent-shaped, in which case the filter member can comprise, in particular schematically, a shape of a tent or a tent roof.

The shaping of the filter member according to the invention from a two-dimensional shape to a three-dimensional shape allows a larger filtration surface, while an air inlet channel cross section stays the same. The conical shape, which has a consistently large air inlet channel cross section, effectively minimizes pressure losses. This means that a larger quantity and/or a larger volume of cooling air is available for cooling the at least one environment sensor. The larger filtration surface additionally allows a larger quantity of foreign particles to be absorbed, which means that maintenance and/or cleaning intervals can be extended compared to the state of the art. In addition, the filter no longer clogs up too quickly because of accumulated dirt. Overall, installation and/or maintenance and/or servicing is therefore simpler and faster compared to the state of the art.

In a preferred embodiment, the filter member comprises at least one fine filter which prevents foreign particles up to a predetermined particle size from entering the interior of the at least one cooling channel. The particle size up to which the fine filter has its filtering effect can be determined by the mesh size of the fine filter. The predetermined particle size preferably relates to an average diameter and/or at least one longitudinal dimension and/or width dimension and/or height dimension of the at least one foreign particle. For example, the fine filter can have a finer mesh compared to a grille provided at a filter inlet, which can represent a coarse filter, and thus prevent the entry of particles not stopped by the coarse filter. The mesh size of the fine filter is not limited in the case at hand, but can be selected depending on the application. In the case at hand, "fine" merely means that the fine filter has a smaller mesh size than a coarse filter of the filter member provided at a filter inlet.

In a preferred embodiment, the filter member comprises a support structure which has the conical and/or inclined and/or cylindrical and/or pot-shaped shape and on which the at least one fine filter is disposed. In other words, the support structure comprises a shape wherein a cross-sectional area of the support structure is smaller than a filter area provided by the support structure. For example, the support structure may be basket-like or lattice-like. The support structure can have several bars which give the filter member a predetermined strength. The support structure preferably comprises several exposed intermediate spaces, each of which is filled with the fine filter in order to provide the filter effect. The support structure may, for example, be produced by overmolding and/or injection molding and/or 3D printing. The support structure preferably comprises a complex three-dimensional shape which determines the basic conical and/or pot-like shape of the filter member.

As an alternative to the support structure, the fine filter itself may have the conical and/or inclined and/or cylindrical and/or pot-shaped shape.

In a preferred embodiment, the filter member comprises at least one liquid draining device, which is provided in particular at a conically tapering end area of the filter member. Particularly preferably, the filter member comprises an opening and/or a drain, which at least partially forms the liquid draining device, at its in particular tapered end area and/or in the conically tapered end area. The liquid draining device preferably comprises a hose and/or a tube and/or another draining member which is attached to the end area of the filter member. In other words, the tapered end of the filter member comprises a preferably small opening, which is particularly preferably inserted into a liquid discharge channel of the cooling mechanism when the filter member is installed on the cooling mechanism. The opening is preferably dimensioned in such a manner that a particle size retained by the fine filter and/or a particle size of foreign particles passing through the prefilter can be diverted and/or discharged via the opening. So the opening is preferably dimensioned in such a manner that even the largest foreign particles entering the filter member can be discharged from it through the opening.

Alternatively, a water supply line to the preferred liquid discharge channel can also be provided integrally on the filter member.

In a preferred embodiment, the roof module comprises a liquid discharge channel configured to discharge liquid from the roof module and/or to drain liquid from the roof module, thereby preventing the liquid from entering an interior of the roof module and/or the interior of the cooling mechanism. In a preferred embodiment, the cooling mechanism comprises a liquid discharge channel which is configured to discharge liquid from the cooling mechanism and/or to drain liquid from the roof module, thereby preventing the liquid from entering an interior of the roof module and/or the interior of the cooling mechanism. In an installed state of the filter member, i.e., when it is inserted into the cooling mechanism, the liquid draining device is in fluid communication with the liquid discharge channel. The fluid communication can be provided, for example, by a transition between the end opening of the filter member and a drain pipe and/or a drain channel. Particularly preferably, liquid entering the filter member can be directed into the liquid discharge channel via the opening at the end of the filter member and thereby drained from the cooling mechanism and/or the roof module.

In a preferred embodiment, the cooling mechanism has an in particular cylindrical opening or mounting opening in an area of the cooling air inlet, the opening extending essentially in a vertical vehicle direction z. The vertical vehicle direction is essentially (i.e., ±20%) orthogonal to a vehicle width direction and/or a longitudinal vehicle direction. The vertical vehicle direction is preferably parallel to a vertical with respect to a vehicle environment. When installed, the filter member is plugged and/or inserted into the opening from the outside. The opening can basically have any shape that corresponds to the filter member, allowing the filter member to be inserted into the opening. The filter member is preferably inserted into the in particular cylindrical opening in the cooling mechanism and/or the cooling channel from the outside in the z-direction. The vertical orientation of the mounting opening along the z-axis and the conical shape of the filter member make it possible, on the one hand, to prevent foreign particles from entering the cooling mechanism. On the other hand, it also allows entering liquid to be drained. For this purpose, the filter member according to the invention is preferably disposed in an area of the liquid discharge channel and/or preferably directly above the liquid discharge channel when viewed in the z-direction with the result that any water entering can be discharged directly into the liquid discharge channel. This advantageous orientation and shape of the filter member allows entering water to additionally wash off dirt from the fine filter and/or wash it out of the filter member. Dirt washed off in this manner, which consists of the foreign particles, can be discharged through the liquid discharge channel. As a result, the filter member according to the invention also has a self-cleaning function. Among other things, this extends intervals for servicing the filter member.

In a preferred embodiment, the opening at least partially connected to the at least one cooling channel. In a particularly preferred embodiment, the filter member comprises a clamping portion through which the filter member is connected to the at least one cooling channel and/or to an end area of the opening via a clamping fit or a clamping connection. For this purpose, a mounting portion or a mating clamping portion into which the filter member engages via its clamping portion can be provided on the at least one cooling channel. Due to the advantageous design with the clamping of the filter member by surrounding components, in particular the at least one cooling channel, and the filter geometry according to the invention, additional fastening components can be saved. When installing the filter member, it is preferably inserted into the opening of the cooling mechanism and/or the cooling channel from the outside and clamped to the cooling channel via a corresponding channel portion. This simplifies the installation process. Additionally, the filter member can be easily replaced from the outside. In addition, the opening may be conically shaped so that the filter member can be fastened in it in a self-clamping manner.

The opening or mounting opening of the cooling mechanism preferably comprises the transition to the at least one liquid discharge channel, allowing the water drainage to be provided directly when the filter is installed.

In a preferred embodiment, the clamping portion in particular geometrically corresponds to a mating portion of the at least one cooling channel and/or in particular geometrically corresponds to the end area of the opening.

In a preferred embodiment, the filter member comprises a prefilter and/or a coarse filter and/or a grille, which is disposed at the cooling-air inlet and/or in the area of the cooling-air inlet and is in particular flush with the surrounding panel component. The prefilter and/or the coarse filter and/or the grille has/have a mesh size that is preferably larger than a mesh size of the fine filter. The prefilter can preferably prevent coarse particles, such as stones and/or leaves and/or insects, from entering the cooling mechanism. In addition, the prefilter preferably has aesthetically pleasing properties and, for example, matches the external appearance of the surrounding panel component and/or the roof module.

In a preferred embodiment, the environment sensor comprises a camera and/or a multi-camera and/or a lidar sensor and/or an ultrasonic sensor and/or an infrared sensor. Other environment sensors are also conceivable. The environment sensor can also be understood as any other electrical and/or electronic and/or electromagnetic component that produces waste heat during its operation. Thus, the environment sensor within the meaning of the present disclosure may comprise a light source and/or an antenna and/or an antenna module and/or a communication device and/or a control device and/or an evaluation device.

The invention also claims a vehicle comprising a vehicle body and at least one roof module according to the invention. The roof module is preferably disposed on the vehicle body as a structural unit.

The roof module according to the invention can basically be disposed anywhere on a motor vehicle and can be configured for different purposes. The motor vehicle can be a passenger car and/or a truck and/or a transport vehicle and/or a troop vehicle and/or a commercial vehicle.

It will be understood that the embodiments and embodiment examples mentioned above and to be explained below can be formed not only individually, but also in any combination with each other without departing from the scope of the present invention. It will also be understood that the embodiments and embodiment examples mentioned above and to be explained below relate in an equivalent or at least similar manner to all embodiments of the invention without being mentioned separately in each case.

BRIEF DESCRIPTIONS OF THE DRAWINGS

Embodiments of the invention are schematically illustrated in the drawings and are explained below by way of example.

DETAILED DESCRIPTION

Figure 1:
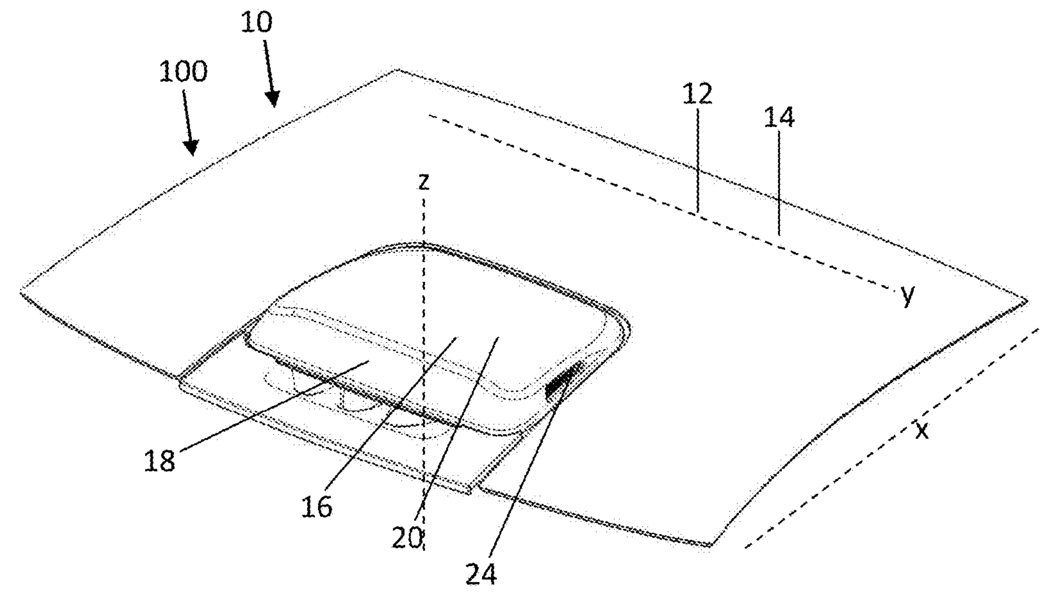
FIG. 1 is a first view of an exemplary roof module according to the invention.
Figure 2:
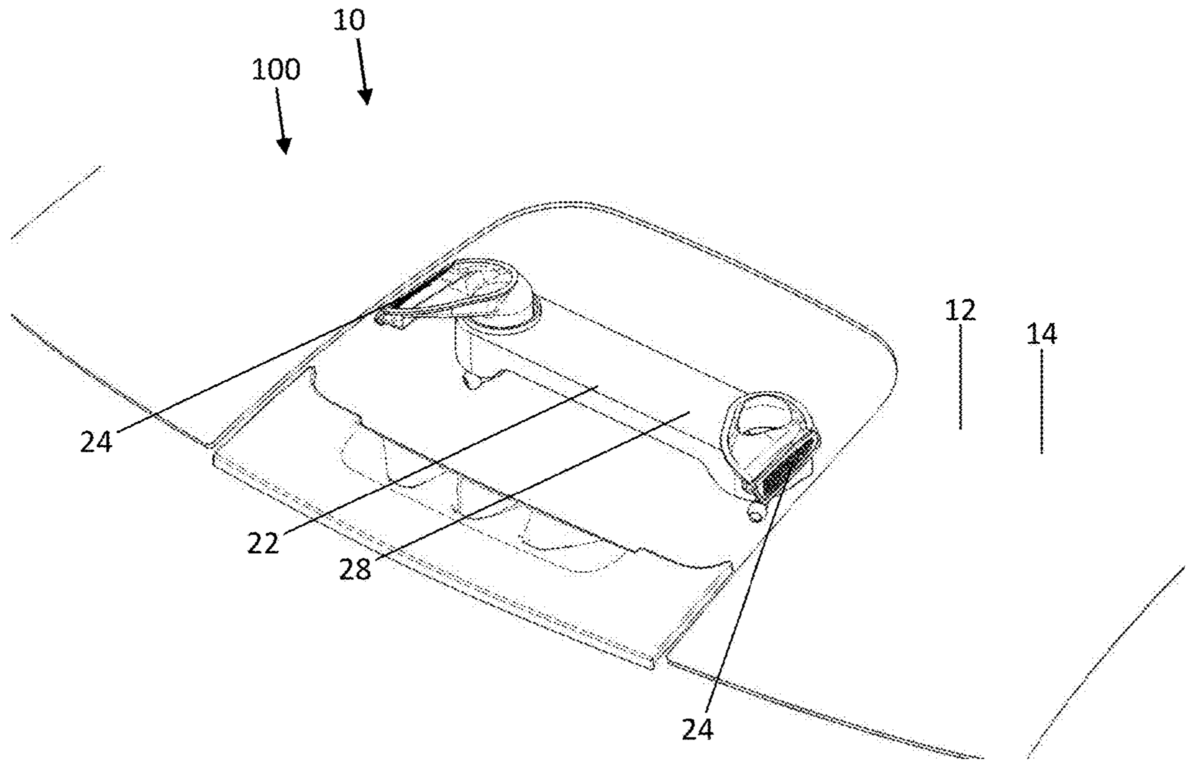
FIG. 2 is a second view of an exemplary roof module according to the invention.
Figure 3:
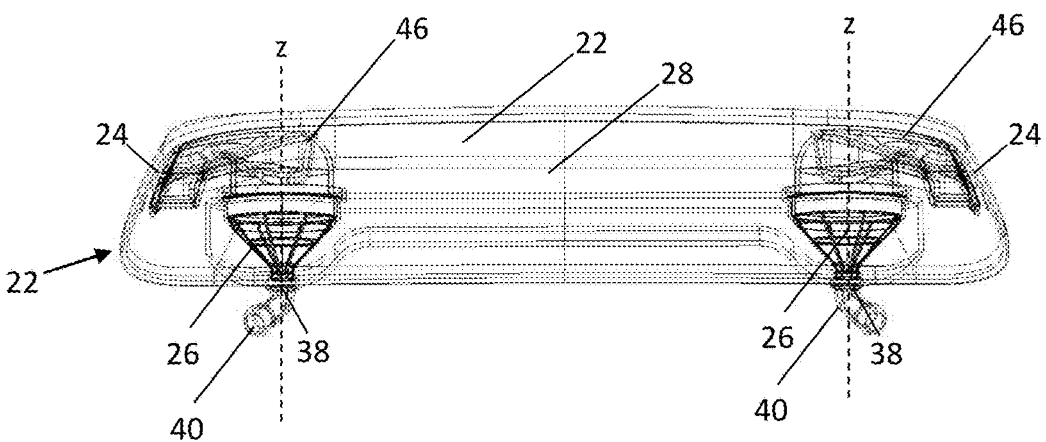
FIG. 3 is a front view of an exemplary cooling mechanism.
Figure 4:
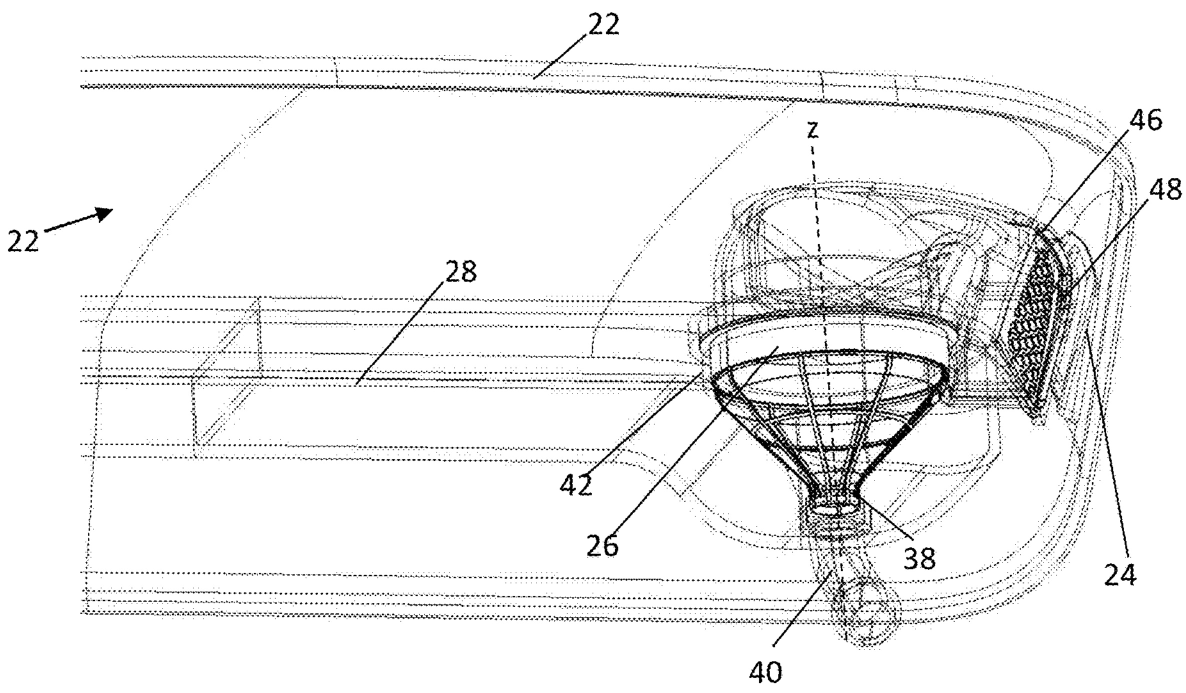
FIG. 4 is a detailed view of the exemplary cooling mechanism.
Figure 5:
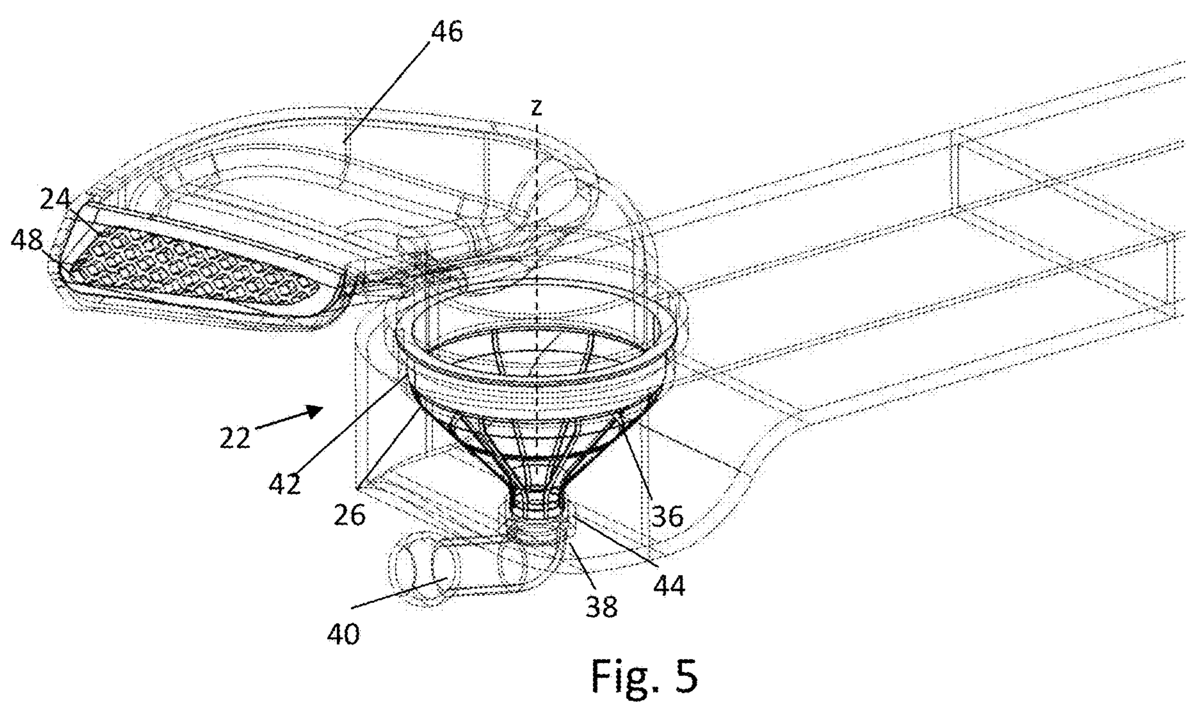
FIG. 5 is a schematic view of an exemplary cooling mechanism.
Figure 6:
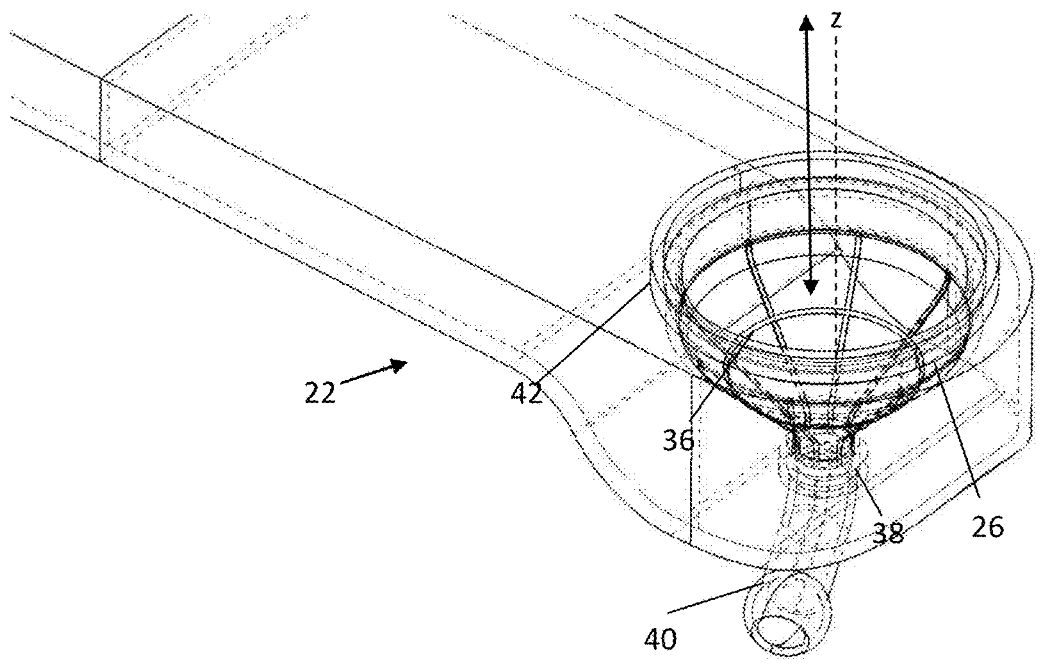
FIG. 6 is a schematic view of an exemplary cooling mechanism.
Figure 7:
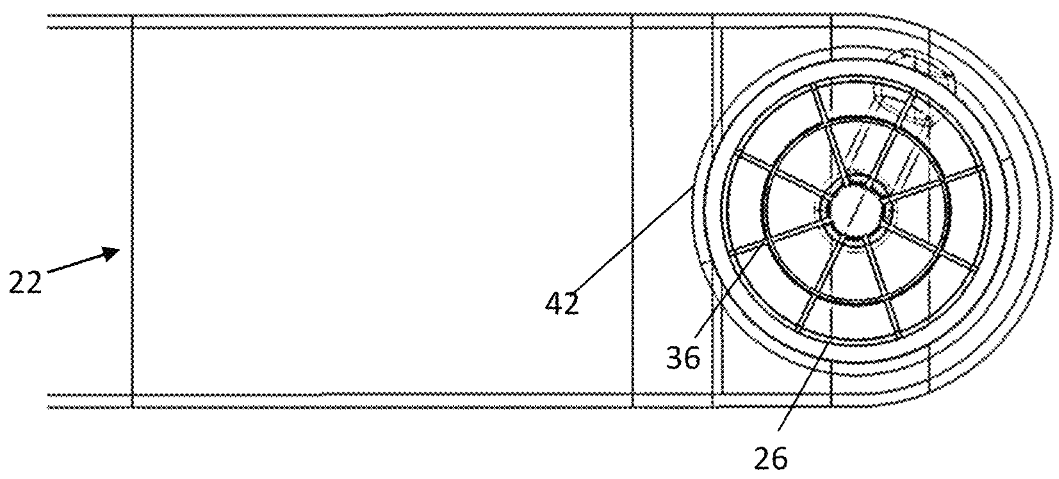
FIG. 7 is a top view of an exemplary cooling mechanism.
Figure 8:
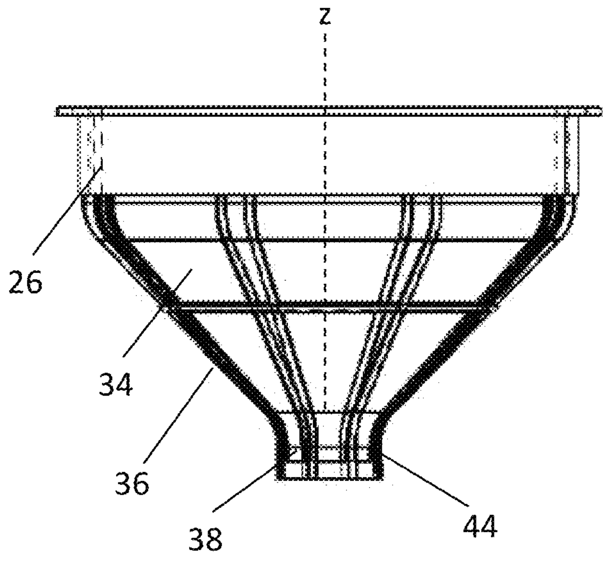
FIG. 8 is a side view of an exemplary filter member.
Figure 9:
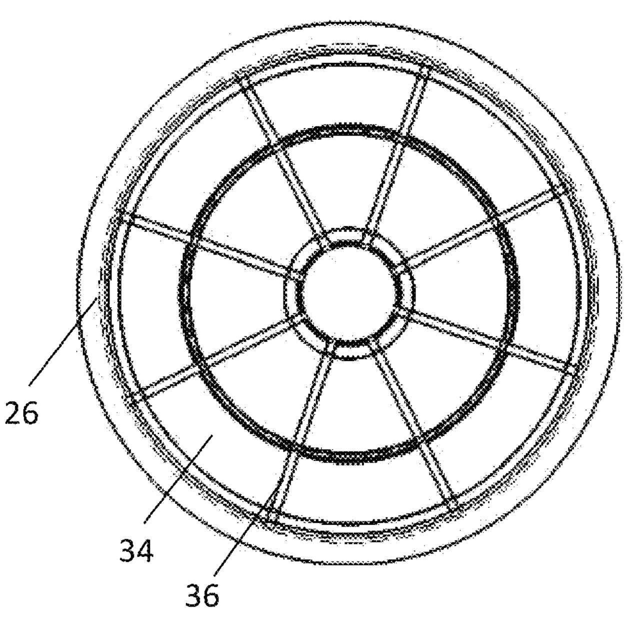
FIG. 9 is a top view of an exemplary filter member.
Figure 10:
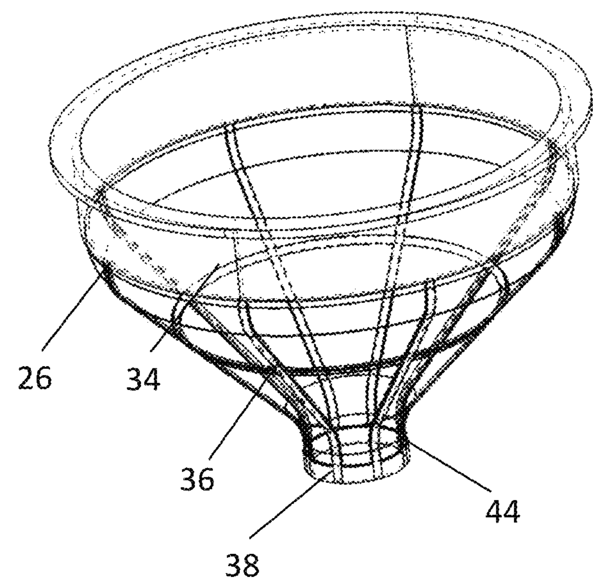
FIG. 10 is a schematic view of an exemplary filter member.

FIG. 1 shows a roof module 10 for forming a vehicle roof 100 on a motor vehicle (not shown). The roof module 10 comprises a panel component 12, which at least partially forms a roof skin 14 of the vehicle roof 100, the roof skin 14 serving as an outer sealing surface of the roof module 10.

The roof module 10 comprises at least one environment sensor 16, which can send and/or receive electromagnetic signals through a roof see-through area 18 to detect a vehicle environment. The environment sensor 16 is a lidar sensor in the case at hand. The roof see-through area 18 is preferably transparent to wavelengths used by the environment sensor 16. In the case at hand, the roof see-through area 18 is integrally formed on a cover 20. The cover 20 covers the environment sensor 16 on the outside and preferably merges into the panel component 12. The cover 20 can also cover other electrical and/or electronic and/or electromagnetic components. The cover 20 can be made of metal and/or plastic and/or another material.

The roof module 10 comprises a cooling mechanism 22. The cooling mechanism 22 is at least partially covered by the cover 20. The cooling mechanism 22 comprises a cooling-air inlet 24, a filter member 26 and at least one cooling channel 28. The cooling mechanism 22 is configured to dissipate waste heat emitted by the at least one environment sensor 16 and/or ambient heat introduced from outside from the environment sensor 16. The cooling mechanism 22 can comprise further cooling components, such as at least one fan and/or at least one heat exchanger and/or at least one heat conducting element and/or at least one heat transfer element and/or at least one heat conducting pipe.

The filter member 26 comprises a conical and/or inclined and/or cylindrical and/or pot-shaped shape, which can be seen in particular in FIGS. 3 to 6, 8 and 10. The filter member 26 is disposed in the area of the cooling-air inlet 24. The filter member 26 is configured to prevent and/or reduce the entry of foreign particles 30 and/or a liquid 32 into an interior of the at least one cooling channel 28 and/or the cooling mechanism 22 and/or other components of the cooling mechanism 22 (see FIGS. 11 and 12). Foreign particles 30 are indicated schematically in FIG. 11. Liquid 32 or a liquid flow within the filter member can be seen schematically in FIG. 12 in the form of arrows.

Figure 11:
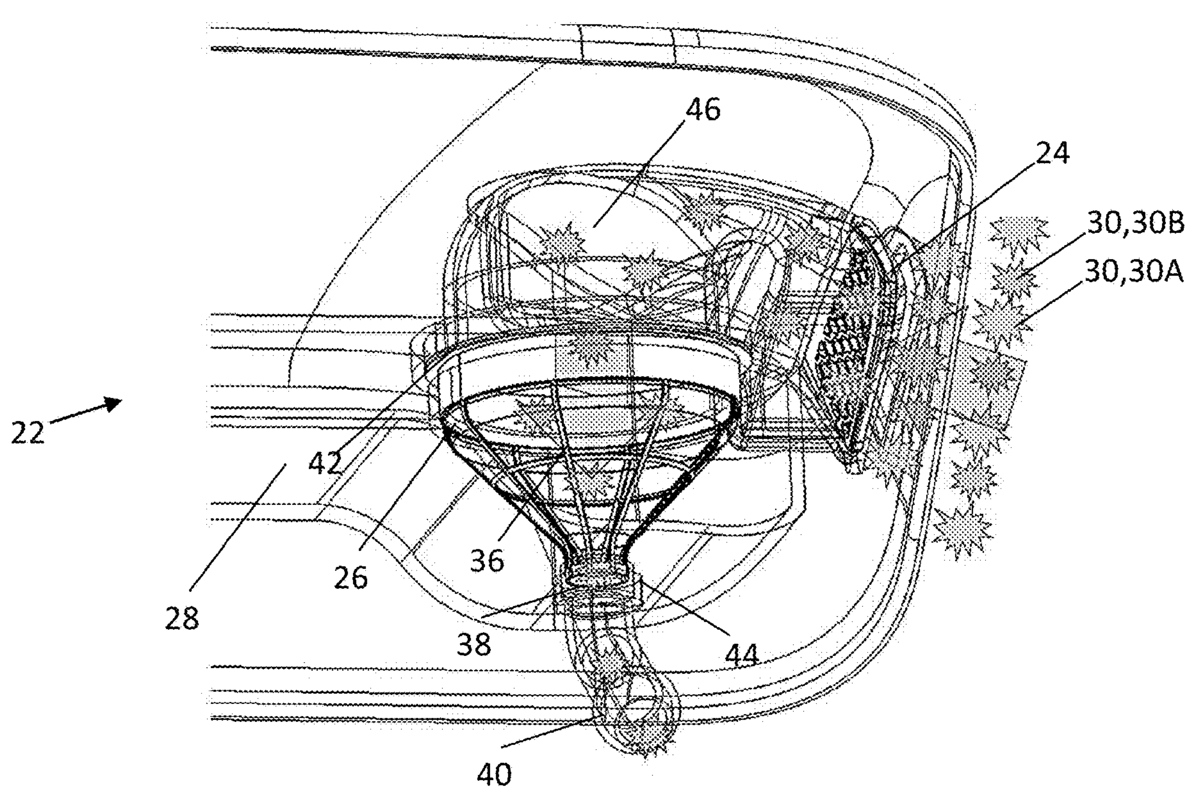
FIG. 11 is a schematic view of an exemplary cooling mechanism.
Figure 12:
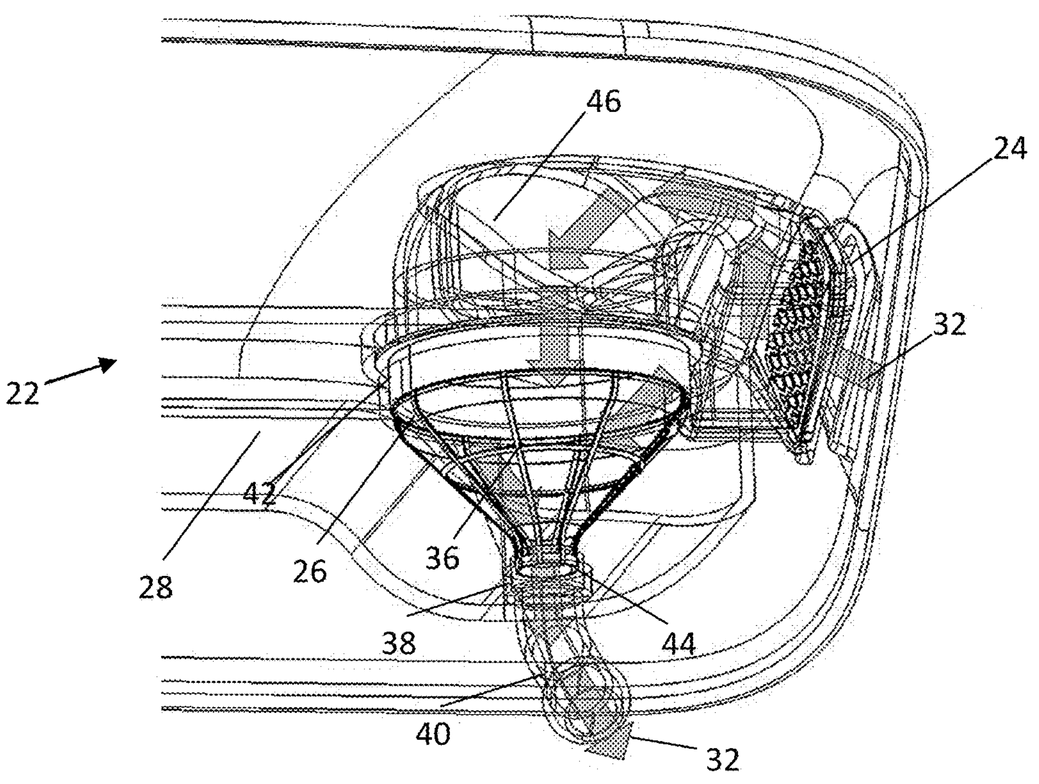
FIG. 12 is a schematic view of an exemplary cooling mechanism.

The filter member 26 comprises at least one fine filter 34, through which the entry of foreign particles 30 up to a predetermined particle size 30B into the interior of the at least one cooling channel 28 can be prevented (see FIG. 11). According to FIG. 11, foreign particles 30, 30A, 30B of two different sizes are schematically indicated.

The filter member 26 has a support structure 36, which has the conical and/or inclined and/or cylindrical and/or pot-shaped shape and on which the at least one fine filter 34 is disposed in sections, in particular in the spaces between the support structure 36. The support structure 36 comprises a plurality of bars. The fine filter is preferably disposed in the spaces between the individual bars, meaning the spaces are filled. The conical shape thus increases the filtration surface.

The filter member 26 comprises at least one liquid draining device 38, which is provided at a tapered end area of the filter member 26. A liquid discharge channel 40 is provided for draining liquid from the roof module 10 and/or the cooling mechanism 22. The liquid discharge channel 40 is configured to discharge liquid 32 from the roof module 10 and/or the cooling mechanism 22 in order to prevent the liquid from entering an interior of the roof module 10. When the filter member 26 is installed (see FIGS. 3 to 7, 11 and 12), the liquid draining device 38 is in fluid communication with the liquid discharge channel 40.

In an area of the cooling-air inlet 24, the cooling mechanism 22 comprises an in particular cylindrical opening 42, which extends essentially in a vertical vehicle direction z, the filter member 26 being plugged and/or inserted into the opening 42 from the outside when installed. The vertical vehicle direction z is orthogonal to a vehicle width direction y and orthogonal to a longitudinal vehicle direction x.

The opening 42 is at least partially connected to the at least one cooling channel 28, and the filter member 26 comprises a clamping portion 44, by means of which the filter member 26 is clamped to the at least one cooling channel 28 and/or to an end area of the opening 42. In the case at hand, the clamping portion 44 engages the cooling channel 28, in particular a mating clamping section provided therein, with the result that the filter member 26 is held in a clamping manner. The filter member 26 is inserted into the cooling mechanism 22 from the outside, see FIG. 3.

In the case at hand, the filter member 26 comprises an in particular multi-stage prefilter 46, which is disposed at the cooling-air inlet 24. Part of the prefilter 46 is flush with the surrounding panel component 12, the prefilter 46 having a mesh size that is larger than a mesh size of the fine filter 34. The prefilter 46 comprises an inlet grille 48, which is disposed at the cooling-air inlet 24. The inlet grille 48 is intended to prevent coarse foreign particles 30A from entering the interior of the cooling channel 28. The prefilter 46 can comprise a filter body which has a bent and/or curved shape, see FIGS. 4 and 5. In this manner, the prefilter can, for example, be disposed on the side of the roof module 10 in the area of the cooling-air inlet 24 and form a flow connection to the filter member 26 mounted in the z-direction.

The invention claimed is:

1. A roof module for forming a vehicle roof on a motor vehicle, the roof module comprising:

a panel component which at least partially forms a roof skin of the vehicle roof, the roof skin serving as an outer sealing surface of the roof module, at least one environment sensor configured to send and/or receive electromagnetic signals through a roof see-through area to detect a vehicle environment, and a cooling mechanism having a cooling-air inlet, a filter member, and at least one cooling channel, the cooling mechanism being configured to dissipate waste heat emitted by the environment sensor and/or ambient heat introduced from outside from the environment sensor, wherein the filter member comprises a conical and/or pot-shaped shape and is provided at the cooling-air inlet and is configured to prevent and/or reduce an entry of foreign particles and/or liquid into an interior of the at least one cooling channel, and wherein the filter member comprises at least one liquid draining device, which is provided at a conically tapering end area of the filter member.

2. The roof module according to claim 1, wherein the filter member comprises at least one fine filter configured to prevent foreign particles up to a predetermined particle size from entering the interior of the at least one cooling channel.

3. The roof module according to claim 2, wherein the filter member comprises a support structure which has a conical and/or inclined and/or cylindrical and/or pot-shaped shape and on which the at least one fine filter is disposed.

4. The roof module according to claim 1, wherein the roof module comprises a liquid discharge channel configured to discharge liquids from the roof module to prevent the liquid from entering an interior of the roof module, the liquid draining device being in fluid communication with the liquid discharge channel when the filter member is installed.

5. The roof module according to claim 1, wherein the cooling mechanism has a cylindrical opening in an area of the cooling-air inlet, the opening extending essentially in a vertical vehicle direction z, the filter member being plugged and/or inserted into the opening from outside when installed.

6. The roof module according to claim 5, wherein the opening is at least partially connected to the at least one cooling channel, and the filter member comprises a clamping portion via which the filter member is clamped to the at least one cooling channel and/or an end area of the opening.

7. The roof module according to claim 6, wherein the clamping portion is configured to correspond to a mating portion of the at least one cooling channel and/or to correspond to the end area of the opening.

8. A motor vehicle comprising a vehicle body and at least one roof module according to claim 1, wherein the roof module is disposed on the vehicle body as a structural unit.

9. A roof module for forming a vehicle roof on a motor vehicle, the roof module comprising:

a panel component which at least partially forms a roof skin of the vehicle roof, the roof skin serving as an outer sealing surface of the roof module, at least one environment sensor configured to send and/or receive electromagnetic signals through a roof see-through area to detect a vehicle environment, and a cooling mechanism having a cooling-air inlet, a filter member, and at least one cooling channel, the cooling mechanism being configured to dissipate waste heat emitted by the environment sensor and/or ambient heat introduced from outside from the environment sensor, wherein the filter member comprises a conical and/or pot-shaped shape and is provided at the cooling-air inlet and is configured to prevent and/or reduce an entry of foreign particles and/or liquid into an interior of the at least one cooling channel, and wherein the filter member comprises a prefilter disposed on the cooling-air inlet and being flush with the surrounding panel component, the prefilter having a mesh size larger than a mesh size of the fine filter.

* * * * *